United States Patent
Wisser et al.

(12) 
(10) Patent No.: US 6,640,914 B2
(45) Date of Patent: Nov. 4, 2003

(54) PERCUSSION BORER FOR FORMING BORES IN STONE MATERIAL

(75) Inventors: Erich Wisser, Bregenz (AT); Marcel John, Mels (CH); Bernhard Sander, Feldkirch (AT); Hanspeter Schad, Grabs (CH); Cord-Henrik Surberg, Feldkirch (AT); Charles Coffin, Chur (CH); Joachim Vedder, Hergensweiler (DE); Reinhard Lins, Sevelen (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/120,658

(22) Filed: Apr. 11, 2002

(65) Prior Publication Data

US 2002/0153173 A1 Oct. 24, 2002

(30) Foreign Application Priority Data

Apr. 21, 2001 (DE) .......................... 101 19 562

(51) Int. Cl.$^7$ ................................. E21B 6/04
(52) U.S. Cl. ................. 175/389; 175/323; 173/95
(58) Field of Search ................. 175/321, 322, 175/323, 385, 389, 390, 388, 392; 173/95, 101, 114

(56) References Cited

U.S. PATENT DOCUMENTS 3,891,036 A * 6/1975 Schmidt .................. 173/91
4,294,319 A * 10/1981 Guergen .................. 175/389
4,819,746 A * 4/1989 Brown et al. ............. 528/92
4,867,249 A 9/1989 Adams
6,431,294 B1 * 8/2002 Eddison et al. ........... 175/415
6,494,275 B2 * 12/2002 Åsberg et al. ............ 175/401

FOREIGN PATENT DOCUMENTS

| DE | 3102075 | 8/1982 |
| DE | 4020242 | 9/1996 |
| GB | 2350315 | 11/2000 |
| WO | 9424404 | 10/1994 |

OTHER PUBLICATIONS

Patent Abstract of Japan JP–09 183 104.
EP Search report EP 02405273 Jul. 24, 2002.

* cited by examiner

Primary Examiner—Frank Tsay
(74) Attorney, Agent, or Firm—Sidley Austin Brown & Wood, LLP

(57) ABSTRACT

A percussion bores for forming borer in a stone material and including a chisel stem (2) having a prismatic cross-section and provided with a chiseling head (3) and at least one radial opening (4), a twist drill (6) extending through the cylindrical through-bore (3) of the chisel stem and projecting beyond the chiseling head (7), a drilling head (10) with cutting elements (9) provided at the projecting end of the twist drill and a shank (12) provided at another end of the twist drill, and a stop (13) provided between the shank (12) and the chisel stem (2), with a drill stem being offset radially inwardly with respect to an outer diameter of the shank in the region of the stop.

15 Claims, 3 Drawing Sheets

US 6,640,914 B2

PERCUSSION BORER FOR FORMING BORES IN STONE MATERIAL

BACKGROUND OF THE INVENTION

1. Field of the Invention

The present invention relates to a percussion borer for forming bores in a stone material such as concrete and brick. The present invention also relates to a particular type of a percussion drilling or boring anchor.

2. Description of the Prior Art

A chisel, which is driven by a percussion tool, and a borer, which is driven by a rotary-percussion tool, are formed both essentially of a stem provided at one of its end with a working head with hard material inserts and provided at its opposite end with a shank to be received in a chuck of the driving tool. When a percussion drilling anchor is used, at least a portion of the anchor remains in the formed bore, as a lost tool, and is anchored in the stone material.

European Publication EP 716 237 discloses a twist drill, which is guided through a hollow dowel sleeve to form a bore and which remains in the formed bore, being expanded by the dowel sleeve.

U.S. Pat. No. 5,374,140 discloses a hollow drilling dowel, which is used as a to-be-lost tool, is provided with hard material inserts, and is chemically anchored.

U.S. Pat. No. 6,145,601 discloses a chemically anchorable drilling dowel having a drilling head sleeve mounted thereon.

Japanese Publication JP-9048004 discloses a percussion borer for forming polygonal holes in wood and including a hollow polygonal chisel stem having an axial shoulder for guiding a coaxial twist drill which extends through the hollow chisel stem. The removable material is removed through radial openings provided in the chisel stem. In order that the twist drill penetrates in the wood impact-free, the twist drill stem is offset with respect to the shank radially inward in the region of the axial shoulder of the shank, with no contact between the shank and the chisel stem. As a result, the twist drill forms no contact pressure pair with the chisel stem. At that, the twist drill is displaced from the hollow chisel stem only in the direction toward the drilling head.

An object of the present invention is to provide an efficient percussion borer for forming bores in a stone material.

Another object of the present invention is to provide a percussion borer formed as a drilling anchor for a stone material.

SUMMARY OF THE INVENTION

These and other objects of the present invention, which will become apparent hereinafter, are achieved by providing a percussion borer including a chisel stem having a prismatic cross-section, an axial cylindrical through-bore, a chiseling head, and at least one radial opening, a twist drill extending through the cylindrical through-bore, projecting beyond the chiseling head, and having at its end projecting beyond the chiseling head, a drilling head with cutting elements and, at an end thereof opposite the drilling head, a shank, and a stop provided between the shank and the chisel stem, with a drill stem being offset radially inwardly with respect to an outer diameter of the shank so that an impact shoulder, which cooperates with the stop, is formed.

The radial reduction of the twist bore diameter in the region of the axial stop results in formation of an impact shoulder on the end surface of the shank facing toward the drilling head. The impact shoulder forms with the stop, which is provided on the chisel stem, a contact pressure pair which provides for transmission of the impacts or blows, which are applied to the twist drill, to the chisel stem. As a result, the bore is widened in accordance with the prismatic cross-section of the chisel stem, so that a non-circular bore is formed. After the bore is formed, the twist drill is lifted off the chisel stem in the direction opposite the operational direction of the borer.

Advantageously, the axial distance between the chiseling head and a tip of the drilling head is in a range from two times to four times of a diameter of the twist drill and, preferably, amounts to about three times of the twist drill diameter. With such a distance, the residual material in front of the chiseling head causes shearing along the breakdown cone and, thus, optimizes the tool output.

Advantageously, the chiseling head has axial chiseling elements which advantageously are chamfered axially inward. With these chiseling elements, the chiseled material is pushed toward the twist drill and is removed by the helice and through the radial opening, which is formed in the prismatic chisel stem.

Advantageously, the axial chiseling elements are formed of a hard material, e.g., a hard material inserts that cut into the stone material and are wear-resistant.

According to one advantageous embodiment of the present invention, the chisel stem, which is formed as to-be-lost tool, has at its end opposite the chiseling head, load application or mounting means in form of an outer or inner thread. The chiseling stem, after the bore had been formed, remains in the bore, at least partially, as an anchor rod.

Advantageously, the chisel stem has an axial, loosely stacked-up, hollow contact section that forms, together with the axial stop of the twist drill, a substantially wearless rotatable contact pressure pair and, thus, can be re-used. Advantageously, the radial opening is formed in the contact section which simplifies the manufacturing of the chiseling stem for use as a to-be-lost tool.

Advantageously, the chisel stem is provided adjacent to the chiseling head with anchoring means which enhance formlocking or forcelocking connection of the remaining portion of the chisel stem with the bore wall.

Advantageously, the anchoring means is formed as an axially displaceable expansion sleeve provided with axial incisions and arranged in a circumferential groove which is formed in a wall of the chisel stem and has a chamfer expanding radially outwardly toward the chiseling head. As a result, upon application of a tensile load, the chisel stem displacement causes a radial expansion of the expansion sleeve, which frictionally engages the bore wall, so that the expansion sleeve is pressed into the wall, providing for force-and formlocking anchoring of the expansion sleeve.

Advantageously, the expansion sleeve is formed as an expansion cap with an inner axial stop rim and an axial bore. Advantageously, axial chiseling elements are provided on the axial end surface of the expansion cap. The expansion cap can be formed as a separate part of a hard, wear-resistant material. The remaining portion of the stem can be formed of a less tough material.

Alternatively, the anchoring means can be formed as sector-shaped expansion angles that expand radially outwardly toward the chiseling head. During rotation of the chisel stem, the sector-shaped angles form an undercut in the drilled bore, whereby with the expansion angles engaging in the undercut, the chisel stem becomes force-and formlockingly secured in the bore.

Alternatively, the anchoring means can be formed as a plurality of axially limited radial recesses. During chemical anchoring, a liquid material, which solidifies later, is injected into the bore and fills the recesses, providing for formlocking anchoring of the chisel stem.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

In the drawings.

In all of the figures, identical elements are designated with the same reference numerals.

DETAILED DESCRIPTION OF THE PREFERRED EMBODIMENT

Figure 1:
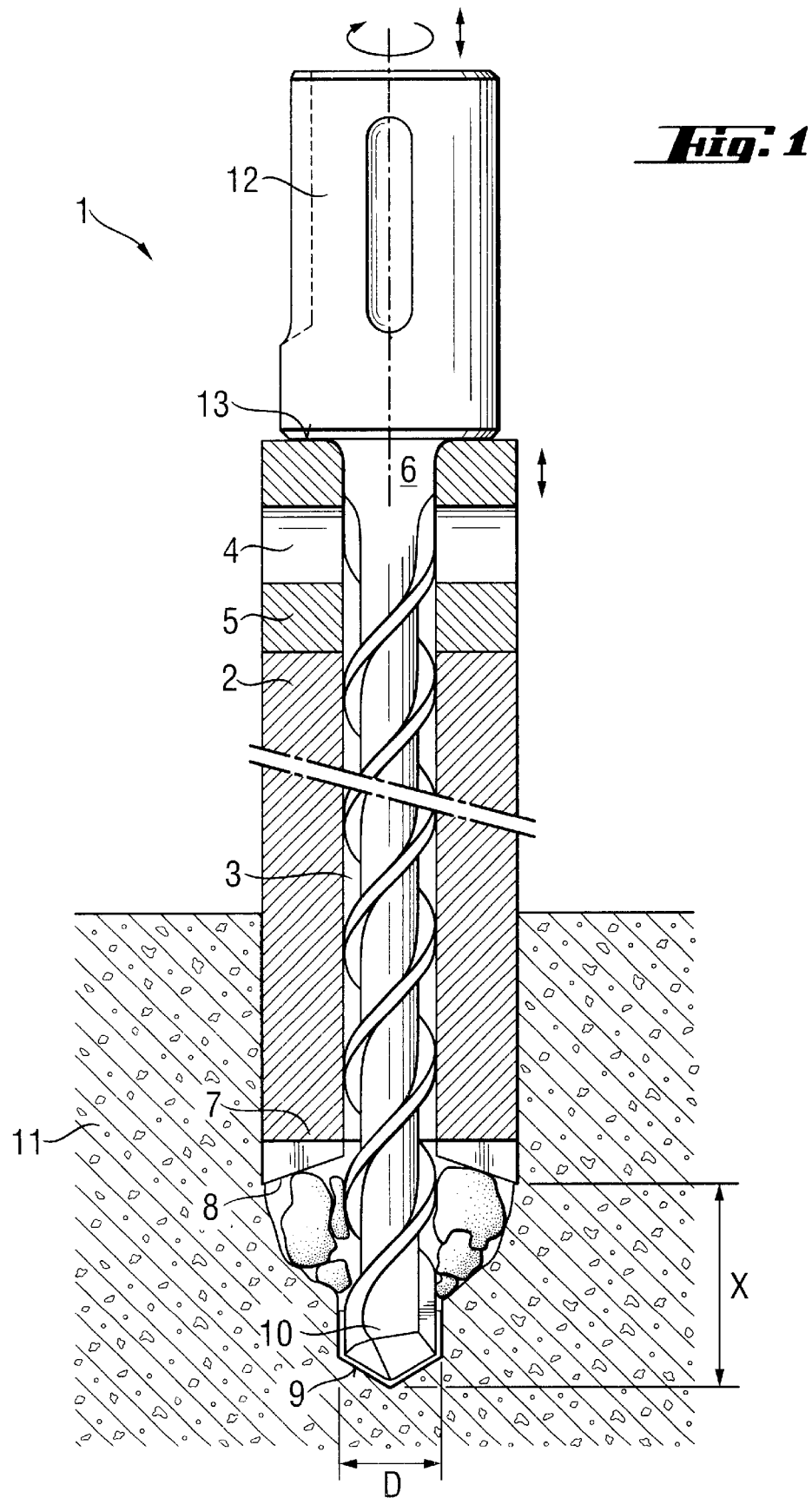
FIG. 1 shows a cross-sectional view of a percussion borer according to the present invention.

A percussion borer according to the present invention, which is shown in FIG. 1, has a chisel stem 2 having a prismatic cross-section and an axial cylindrical through-bore 3, a loosely stacked-up, on the stem 2, hollow contact section 5 with a radial opening 4, and a twist drill 6 rotatably displaceable in the cylindrical through-bore 3. At the free end of the chisel stem 2, there is provided a chiseling head 7 with chiseling cutting elements 8 formed of a hard material and chamfered axially inward. The twist drill 6 has, at its end projecting beyond the chisel stem 2, a drilling head 10 with cutting elements 9 formed likewise of a hard material. At its end remote from the chiseling head 7, the chisel stem 2 forms a stop 13 for the shank 12 of the twist drill 6. The stem of the twist drill 6 is offset radially inward with respect to the outer diameter of the shank 12, whereby an impact shoulder is formed. The axial projection X of the drilling head 10 relative to the chiseling head 7 corresponds approximately to a tripple of the diameter D of the drilling head 10 and, thus, to the region of the broken stone 11 in front of the chiseling head 7.

Figure 2:
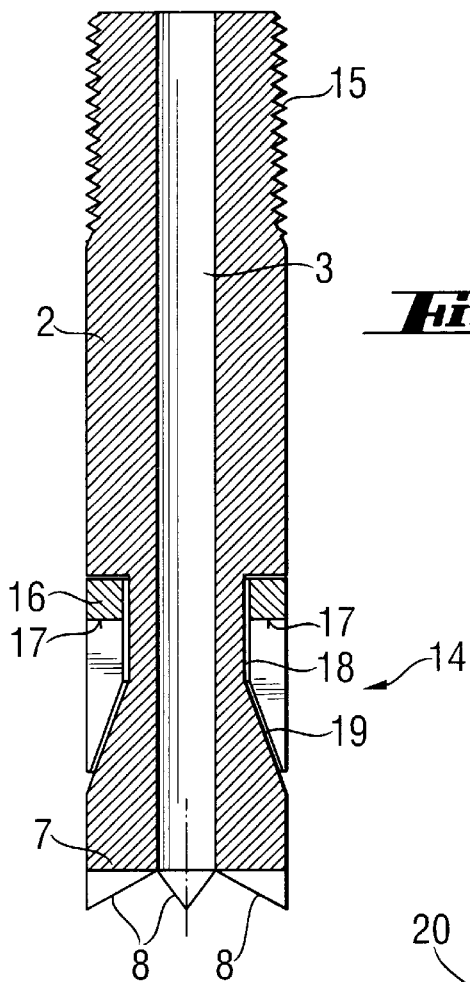
FIG. 2 shows a cross-sectional view of a percussion drilling anchor according to the present invention.

A percussion drilling anchor according to the present invention is formed as a to-be-lost tool. As shown in FIG. 2, the anchor is formed as a chiseling stem 2 having anchoring means 14 in the vicinity of its chiseling head 7 provided with chiseling elements 8. The chisel stem 2 is formed as a tubular member with a bore 3 and is provided, at its end opposite the chiseling head 7, with an outer thread 15 that forms load application means. The anchoring means 14 is formed as an axially displaceable expansion sleeve 16 having directed axially inward chamfers and incisions 17. The expansion sleeve 16 is located in a circumferential radial grove 18 which is formed in the wall of the chisel stem 2 and is provided with an expanding radially outwardly, toward the chiseling head 7, expanding chamfer 19.

Figure 3:
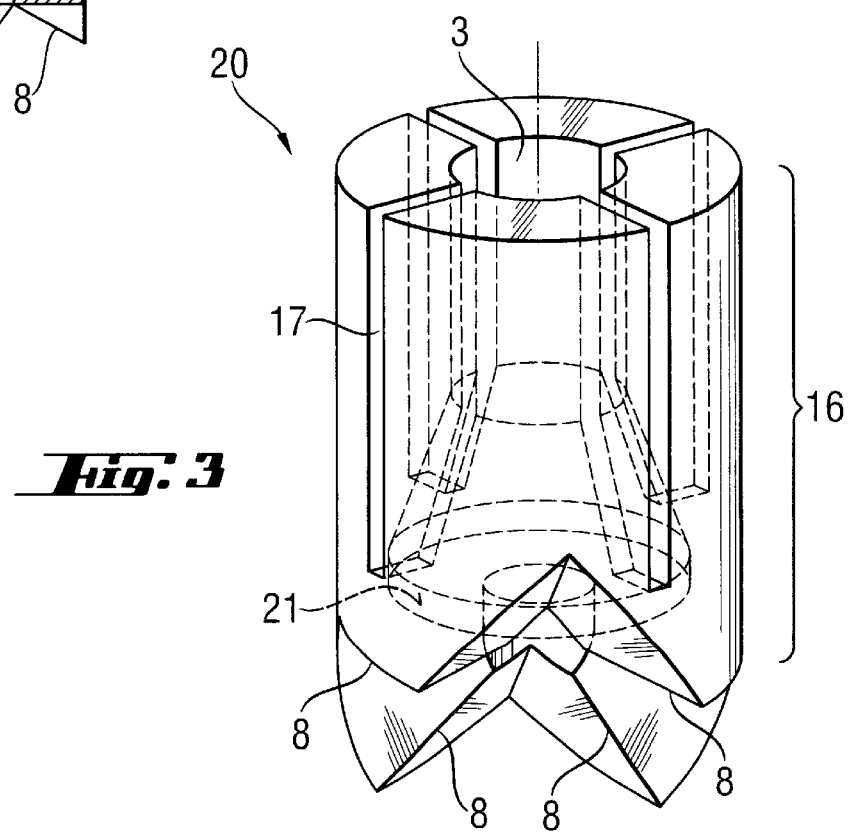
FIG. 3 shows a perspective view of a boring expansion cap.

According to FIG. 3, the expansion sleeve 16 with incisions 17 forms part of an expansion cap 20 provided with axial chiseling elements 8 and a cylindrical through-bore 3. On the end side of the expansion cap 20, there is provided an inner axial stop rim 21.

Figure 4:
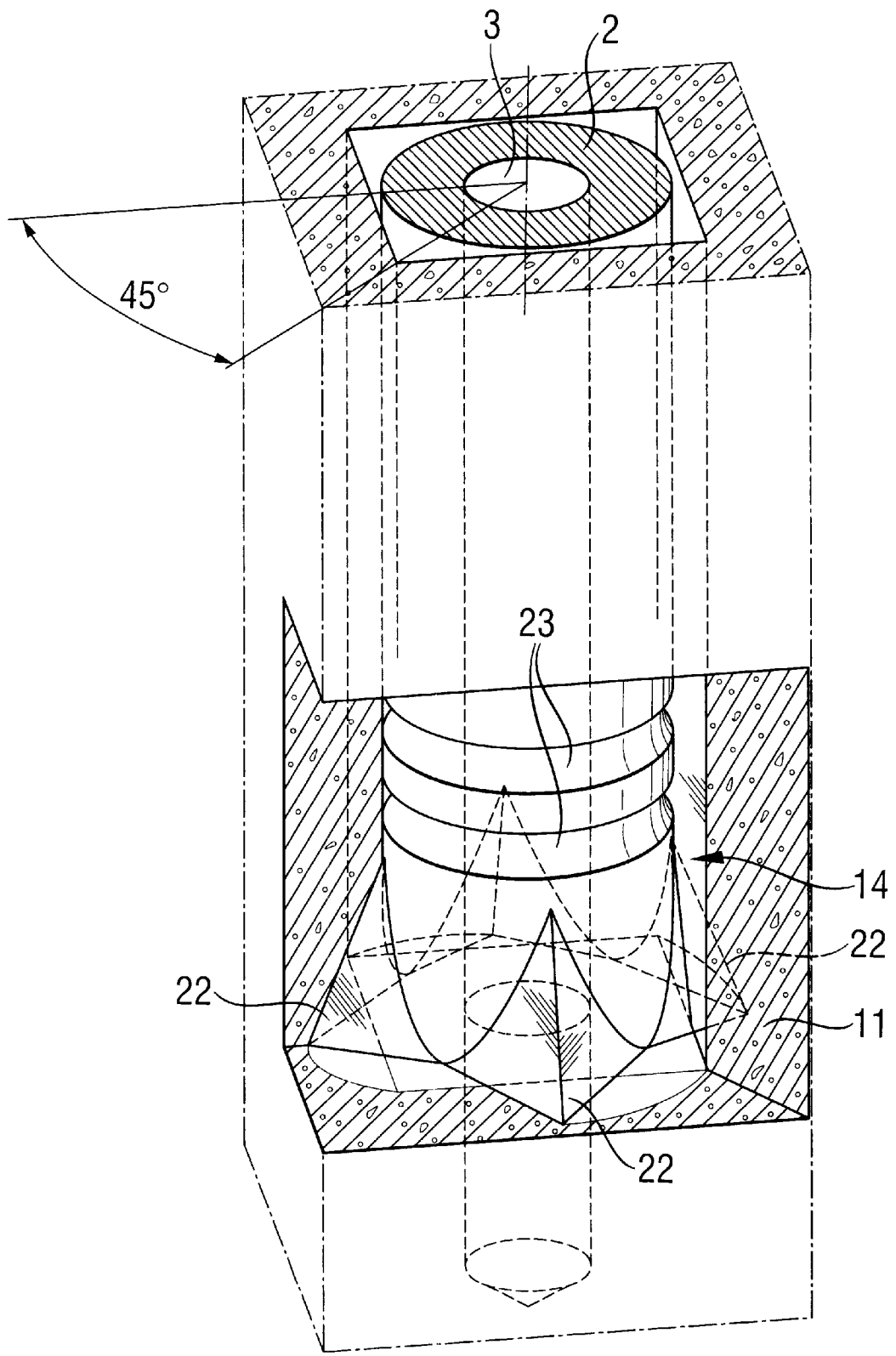
FIG. 4 shows a perspective schematic view of a chiseling stem with expansion edges and cavities.

A chiseling stem 2, which, as shown in FIG. 4, extends through a rectangular bore in stone 11, is pivoted by 45° in comparison with the position shown in FIG. 1. The anchoring means 14 is formed of four sector-shaped expansion angles 22 expanding radially outwardly toward the chiseling head 7. The chiseling stem 2 has, in its region adjacent to the anchoring means 14, two circumferential radial grooves 23.

Though the present invention was shown and described with references to the preferred embodiments, such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A percussion borer for forming bores in stone material (11), comprising a chisel stem (2) having a prismatic cross-section, an axial cylindrical through-bore (3), a chiseling head (7), and at least one radial opening (4); a twist drill (6) extending through the cylindrical through-bore (3), projecting beyond the chiseling head (7), and having at an end thereof projecting beyond the chiseling head (7), a drilling head (10) with cutting elements (9) and, at an end thereof opposite the drilling head (10), a shank (12); and a stop (13) provided between the shank (12) and the chisel stem (2), with a drill stem being offset radially inwardly with respect to an outer diameter of the shank (12), whereby an impact shoulder impacting the stop (13) is formed.

2. A percussion borer according to claim 1, wherein an axial distance (X) between the chiseling head (7) and a tip of the drilling head (10) is in a range from two times to four times of a diameter (D) of the twist drill (6).

3. A percussion borer according to claim 2, wherein the axial distance (X) between the chiseling head (7) and the tip of the drilling head (10) exceeds the diameter (D) of the twist drill (6) in three times.

4. A percussion borer according to claim 1, wherein the chiseling head (7) has axial chiseling elements (8).

5. A percussion borer according to claim 4, wherein the chiseling elements (8) are chamfered radially inward.

6. A percussion borer according to claim 4, wherein the chiseling elements (8) are formed of a hard material.

7. A percussion borer according to claim 1, where in the chisel stem (2) is provided with load application means (15) at an end thereof remote from the chiseling head (7), and anchoring means (14) arranged adjacent to the chiseling head (7).

8. A percussion borer according to claim 1, wherein the chisel stem (2) has an axial, loosely stacked-up, contact section (5).

9. A percussion borer according to claim 8, wherein the radial opening (4) is formed in the contact section (5).

10. A percussion borer according to claim 7, wherein the anchoring means (14) comprises an axially displaceable expansion sleeve (16) provided with axial incisions (17) and arranged in a circumferential groove (18) formed in a wall of the chisel stem (2) and having a chamfer (19) expanding radially outwardly toward the chiseling head (7).

11. A percussion borer according to claim 10, wherein the expansion sleeve (16) has an inner, extending axially inward chamfer.

12. A percussion borer according to claim 10, wherein the expansion sleeve (16) forms a part of an expansion cap (20) having an inner axial stop rim (21) and an axial through-bore (3).

13. A percussion borer according to claim 12, wherein the expansion cap (20) has, at an end side thereof, axially extending chiseling elements (8).

14. A percussion borer according to claim 7, wherein the anchoring means (14) comprises sector-shaped, expanding radially outwardly toward the chiseling head (7), expansion angles (22).

15. An percussion borer according to claim 14, wherein the chisel stem (2) has a plurality of axially limited, radial grooves (23).

* * * * *